(12) United States Patent
Li et al.

(10) Patent No.: US 12,013,581 B2
(45) Date of Patent: Jun. 18, 2024

(54) OPTICAL MODULE

(71) Applicant: Hisense Broadband Multimedia Technologies Co., Ltd., Shandong (CN)

(72) Inventors: Dan Li, Shandong (CN); Mengbo Fu, Shandong (CN); Yifan Xie, Shandong (CN); Qinhao Fu, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 267 days.

(21) Appl. No.: 17/490,035

(22) Filed: Sep. 30, 2021

(65) Prior Publication Data

US 2022/0019035 A1    Jan. 20, 2022

Related U.S. Application Data

(63) Continuation-in-part of application No. PCT/CN2020/130192, filed on Nov. 19, 2020.

(30) Foreign Application Priority Data

May 22, 2020 (CN) .......................... 202010441912.8
May 22, 2020 (CN) .......................... 202020885643.X

(51) Int. Cl.
*H04B 10/00*      (2013.01)
*G02B 6/42*       (2006.01)

(52) U.S. Cl.
CPC ........... *G02B 6/4206* (2013.01); *G02B 6/428* (2013.01)

(58) Field of Classification Search
CPC ...... G02B 6/4206; G02B 6/428; G02B 6/421; G02B 6/4292; G02B 6/425; G02B 6/4214
See application file for complete search history.

(56) References Cited

U.S. PATENT DOCUMENTS

| | | | |
|---|---|---|---|
| 7,376,308 B2* | 5/2008 | Cheben | G02B 6/425 |
| | | | 385/47 |
| 9,134,494 B2* | 9/2015 | Wang | G02B 6/32 |
| | (Continued) | | |

FOREIGN PATENT DOCUMENTS

| CN | 203786341 U | 8/2014 |
|---|---|---|
| CN | 203786941 U | 8/2014 |
| | (Continued) | |

OTHER PUBLICATIONS

International Search Report and Written Opinion issued in corresponding International Application No. PCT/CN2020/130190 dated Feb. 23, 2021, with English abstract.

(Continued)

*Primary Examiner* — Agustin Bello
(74) *Attorney, Agent, or Firm* — Morgan, Lewis & Bockius LLP

(57) ABSTRACT

An optical module includes a shell, a circuit board, a light-receiving device and an optical fiber ribbon. The circuit board is located in the shell. The light-receiving device is disposed on the circuit board and is electrically connected to the circuit board. An end of the optical fiber ribbon is connected to the light-receiving device. The light-receiving device includes a light-receiving chip and a focusing lens. The light-receiving chip is disposed on a surface of the circuit board and has a photosensitive surface. The focusing lens is disposed opposite to the photosensitive surface of the light-receiving chip, and is configured to converge light transmitted by the optical fiber ribbon to the photosensitive surface of the light-receiving chip.

15 Claims, 6 Drawing Sheets

(56) References Cited

U.S. PATENT DOCUMENTS

| | | | | |
|---|---|---|---|---|
| 9,341,786 B1* | 5/2016 | Gamache | ............... | G02B 6/30 |
| 9,645,334 B2* | 5/2017 | Ishii | ............... | G02B 6/4269 |
| 9,703,041 B2* | 7/2017 | Smith | ............... | G02B 6/34 |
| 9,739,953 B2* | 8/2017 | Moriyama | ............... | G02B 6/4284 |
| 9,791,640 B2* | 10/2017 | Bowen | ............... | G02B 6/423 |
| 9,798,087 B1* | 10/2017 | Mathai | ............... | G02B 6/2938 |
| 10,440,799 B2* | 10/2019 | Zheng | ............... | H05K 9/0058 |
| 10,809,474 B2* | 10/2020 | Wang | ............... | G02B 6/4261 |
| 11,099,341 B1* | 8/2021 | Bradley | ............... | G02B 6/43 |
| 2003/0086660 A1* | 5/2003 | Brezina | ............... | G02B 6/4201 |
| | | | | 385/88 |
| 2003/0174964 A1* | 9/2003 | Gao | ............... | G02B 6/30 |
| | | | | 385/50 |
| 2004/0202477 A1* | 10/2004 | Nagasaka | ............... | G02B 6/4214 |
| | | | | 398/138 |
| 2008/0226228 A1* | 9/2008 | Tamura | ............... | G02B 6/4214 |
| | | | | 385/33 |
| 2012/0008899 A1 | 1/2012 | Morioka | | |
| 2012/0241600 A1* | 9/2012 | Lee | ............... | G02B 6/4214 |
| | | | | 250/492.1 |
| 2013/0108224 A1* | 5/2013 | Ishigami | ............... | G02B 6/4284 |
| | | | | 385/89 |
| 2014/0153195 A1* | 6/2014 | You | ............... | G02B 6/4261 |
| | | | | 361/728 |
| 2014/0169389 A1* | 6/2014 | Kim | ............... | G02B 6/4214 |
| | | | | 370/536 |
| 2014/0183344 A1* | 7/2014 | Lee | ............... | G02B 6/4224 |
| | | | | 250/227.24 |
| 2014/0193124 A1* | 7/2014 | Bylander | ............... | G02B 6/38 |
| | | | | 385/93 |
| 2014/0193160 A1* | 7/2014 | Yagisawa | ............... | G02B 6/4284 |
| | | | | 398/136 |
| 2014/0369651 A1* | 12/2014 | Ben David | ............... | G02B 6/4204 |
| | | | | 385/89 |
| 2015/0016786 A1* | 1/2015 | Chang | ............... | G02B 6/4292 |
| | | | | 385/93 |
| 2015/0362685 A1* | 12/2015 | Shah | ............... | G02B 6/4214 |
| | | | | 250/552 |
| 2016/0149662 A1* | 5/2016 | Soldano | ............... | G02B 6/4215 |
| | | | | 385/14 |
| 2016/0202434 A1* | 7/2016 | Masahiko | ............... | G02B 6/3893 |
| | | | | 385/14 |
| 2016/0246019 A1* | 8/2016 | Ishii | ............... | G02B 6/4246 |
| 2016/0266340 A1* | 9/2016 | Zhang | ............... | G02B 6/4284 |
| 2016/0349451 A1* | 12/2016 | Shen | ............... | G02B 6/12019 |
| 2017/0168252 A1* | 6/2017 | Pezeshki | ............... | G02B 6/428 |
| 2017/0307819 A1* | 10/2017 | Ho | ............... | H04J 14/0256 |
| 2017/0336582 A1* | 11/2017 | Luo | ............... | G02B 6/4206 |
| 2018/0196209 A1 | 7/2018 | Amit | | |
| 2019/0018206 A1* | 1/2019 | Luo | ............... | G02B 6/43 |
| 2019/0346640 A1* | 11/2019 | Xie | ............... | G02B 6/4256 |
| 2020/0012055 A1* | 1/2020 | Ye | ............... | H04J 14/0256 |
| 2020/0168655 A1* | 5/2020 | Wang | ............... | G02B 6/12011 |
| 2020/0328814 A1* | 10/2020 | Luo | ............... | H04J 14/02 |
| 2021/0157058 A1* | 5/2021 | Lin | ............... | G02B 6/4246 |
| 2022/0019035 A1* | 1/2022 | Li | ............... | G02B 6/428 |

FOREIGN PATENT DOCUMENTS

| | | |
|---|---|---|
| CN | 107076942 A | 8/2017 |
| CN | 110376688 A | 10/2019 |
| CN | 110471148 A | 11/2019 |
| CN | 110488433 A | 11/2019 |
| CN | 111458816 A | 7/2020 |

OTHER PUBLICATIONS

International Search Report and Written Opinion issued in corresponding International Application No. PCT/CN2020/123192 dated Feb. 23, 2021, with English abstract.

* cited by examiner

OPTICAL MODULE

CROSS-REFERENCE TO RELATED APPLICATIONS

This application is a Continuation-in-Part of International Patent Application No. PCT/CN2020/130192 filed on Nov. 19, 2020, which claims priority to Chinese Patent Application No. 202010441912.8, filed on May 22, 2020, and Chinese Patent Application No. 202020885643.X, filed on May 22, 2020, which are incorporated herein by reference in their entireties.

TECHNICAL FIELD

The present disclosure relates to the field of optical communication technologies, and in particular, to an optical module.

BACKGROUND

Optical communication technologies are used in new services and application modes such as cloud computing, mobile Internet and video conferencing. In the optical communication, an optical module is a tool for achieving inter-conversion between an optical signal and an electrical signal, and is one of key components in an optical communication device.

Typically, a light-receiving chip is provided inside an optical module for receiving optical signals. A common light-receiving chip is a PIN photodiode or an avalanche photodiode (APD). After an optical signal sent by an external device is incident on a photosensitive surface of the light-receiving chip through an optical fiber, the light-receiving chip generates a current signal by virtue of a photoelectric conversion effect, and the current signal is sent to a master monitor after it is processed by other components inside the optical module.

SUMMARY

An optical module is provided. The optical module includes a shell, a circuit board, a light-receiving device, an optical fiber socket and an optical fiber ribbon. The circuit board is located in the shell. The light-receiving device is disposed on the circuit board and is electrically connected to the circuit board. The optical fiber socket forms an optical port of the circuit board and is configured to be optically connected to an optical fiber outside the optical module. An end of the optical fiber ribbon is connected to the optical fiber socket, and another end thereof is optically connected to the light-receiving device. The light-receiving device includes a light-receiving chip and a focusing lens. The light-receiving chip is disposed on a surface of the circuit board and has a photosensitive surface. The focusing lens is disposed opposite to the photosensitive surface of the light-receiving chip and is configured to converge light transmitted by the optical fiber ribbon to the photosensitive surface of the light-receiving chip

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on an actual size of a product, an actual process of a method and actual timings of signals to which the embodiments of the present disclosure relate.

DETAILED DESCRIPTION

Figure 1A:
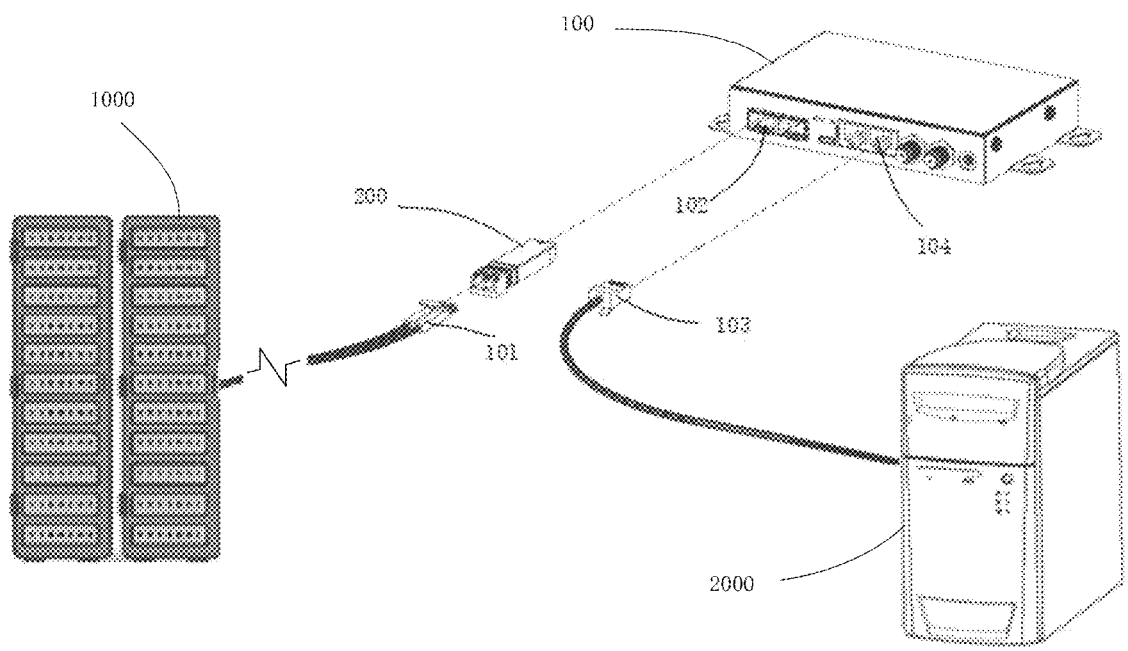
FIG. 1A is a schematic diagram of a connection relationship of an optical communication system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to". In the description of the specification, the terms "one embodiment", "some embodiments", "exemplary embodiments", "an example" or "some examples" and the like are intended to indicate that specific features, structures, materials, or characteristics related to the embodiment or example are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of/the plurality of" means two or more unless otherwise specified.

In the description of some embodiments, the terms "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of "adapted to" or "configured to" herein implies an open and inclusive expression that does not exclude devices adapted to or configured to perform additional tasks or steps.

The term "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

In optical communication technologies, an optical signal is used to carry information to be transmitted, and the optical signal carrying the information is transmitted to an information processing device such as a computer through an information transmission device such as an optical fiber or an optical waveguide, so as to achieve transmission of the information. Since the optical signal has a characteristic of passive transmission when being transmitted through the optical fiber or the optical waveguide, thus low-cost and low-loss information transmission may be achieved. In addition, a signal transmitted by the information transmission device such as the optical fiber or the optical waveguide is an optical signal, while a signal that can be recognized and processed by the information processing device such as a computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of interconversion between the optical signal and the electrical signal in the field of optical fiber communication technologies. The optical module includes an optical port and an electrical port. The optical module achieves optical communication with the information transmission device such as the optical fiber or the optical waveguide through the optical port. And the optical module achieves electrical connection with an optical network terminal (e.g., an optical modem) through the electrical port. The electrical connection is mainly to achieve power supply, transmission of an 12C signal, transmission of a data signal and grounding. The optical network terminal transmits the electrical signal to the information processing device such as the computer through a network cable or wireless fidelity (Wi-Fi).

Figure 1B:
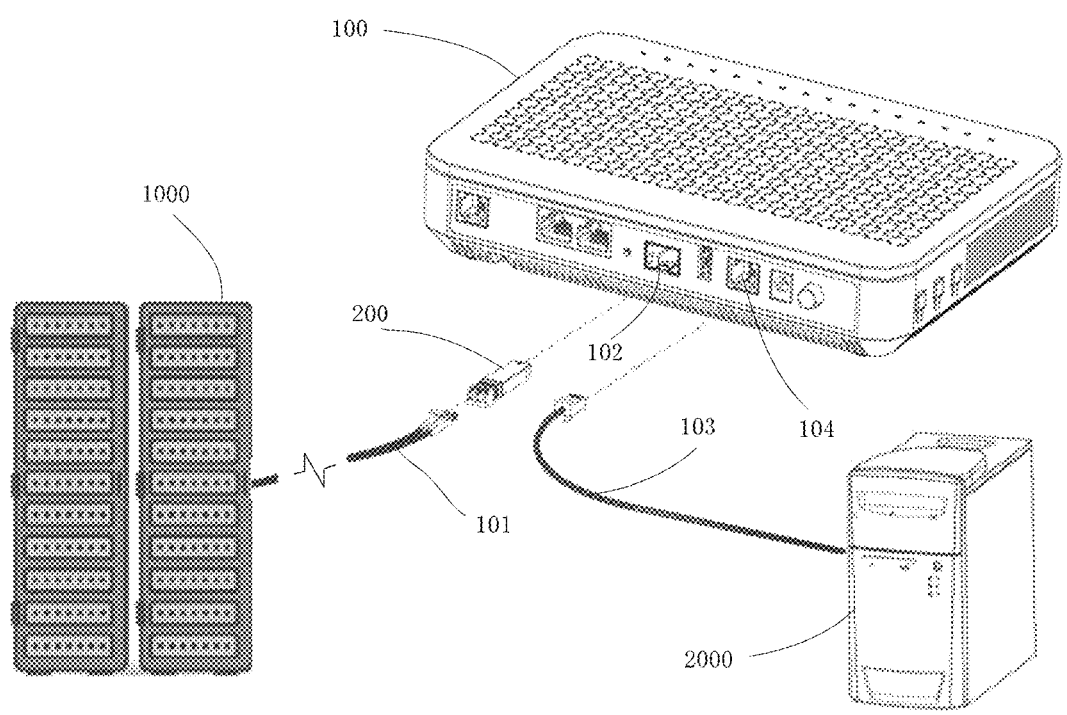
FIG. 1B is a schematic diagram of a connection relationship of another optical communication system, in accordance with some embodiments.

FIG. 1A is a schematic diagram of a connection relationship of an optical communication system in accordance with some embodiments, and FIG. 1B is a schematic diagram of a connection relationship of another optical communication system in accordance with some embodiments. As shown in FIGS. 1A and 1B, the optical communication system mainly includes a remote server 1000, a local information processing device 2000, an optical network terminal 100, an optical module 200, an optical fiber 101 and a network cable 103.

An end of the optical fiber 101 is connected to the remote server 1000, and another end thereof is connected to the optical network terminal 100 through the optical module 200. The optical fiber itself may support long-distance signal transmission, such as signal transmission of several kilometers (6 kilometers to 8 kilometers). Based on this, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

An end of the network cable 103 is connected to the local information processing device 2000, and another end thereof is connected to the optical network terminal 100. The local information processing device 2000 is at least one of the followings: a router, a switch, a computer, a mobile phone, a tablet computer, or a television.

A physical distance between the remote server 1000 and the optical network terminal 100 is greater than a physical distance between the local information processing apparatus 2000 and the optical network terminal 100. A connection between the local information processing device 2000 and the remote server 1000 is completed by the optical fiber 101 and the network cable 103, and a connection between the optical fiber 101 and the network cable 103 is completed by the optical module 200 and the optical network terminal 100.

The optical module 200 includes the optical port and the electrical port. The optical port is configured to be connected to the optical fiber 101, so that a bidirectional optical signal connection between the optical module 200 and the optical fiber 101 is established; and the electrical port is configured to access the optical network terminal 100, so that a bidirectional electrical signal connection between the optical module 200 and the optical network terminal 100 is established. Interconversion between the optical signal and the electrical signal is achieved by the optical module 200, so that a connection between the optical fiber 101 and the optical network terminal 100 is established. For example, the optical signal from the optical fiber 101 is converted into an electrical signal by the optical module 200 and then the electrical signal is input into the optical network terminal 100, and the electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that the bidirectional electrical signal connection between the optical network terminal 100 and the network cable 103 is established. A connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
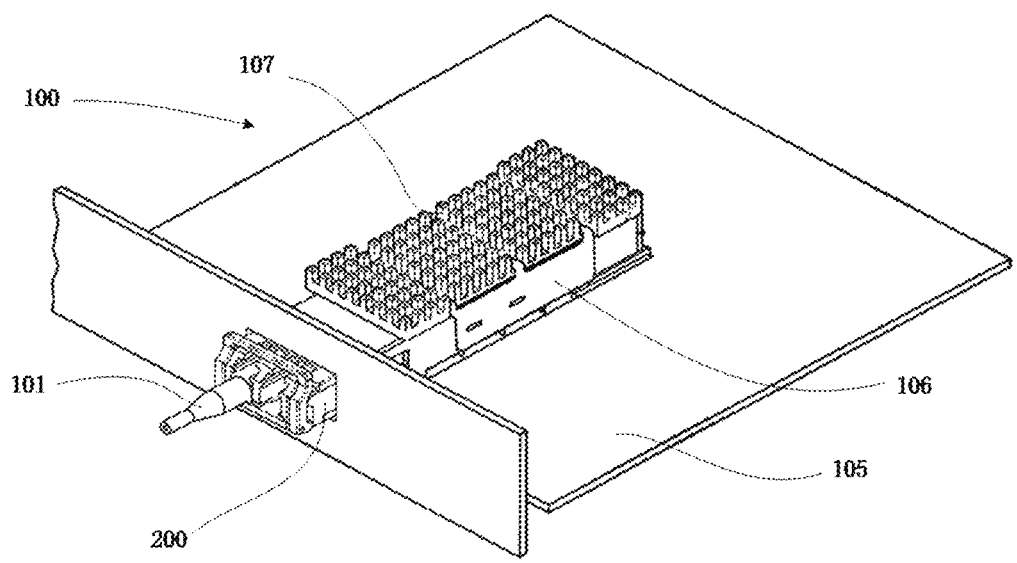
FIG. 2 is a structural diagram of an optical network terminal, in accordance with some embodiments.

FIG. 2 is a structural diagram of an optical network terminal in accordance with some embodiments. In order to clearly show a connection relationship between the optical module 200 and the optical network terminal 100, FIG. 2 only shows a structure of the optical network terminal 100 related to the optical module 200. As shown in FIG. 2, the optical network terminal 100 includes a circuit board 105 disposed in the housing, a cage 106 disposed on a surface of the circuit board 105, a heat sink 107 disposed on the cage 106, and an electrical connector disposed inside the cage 106. The electrical connector is configured to access the electrical port of the optical module 200. The heat sink 107 has protrusions such as fins for increasing a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector in the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the optical fiber 101 is established.

Figure 3:
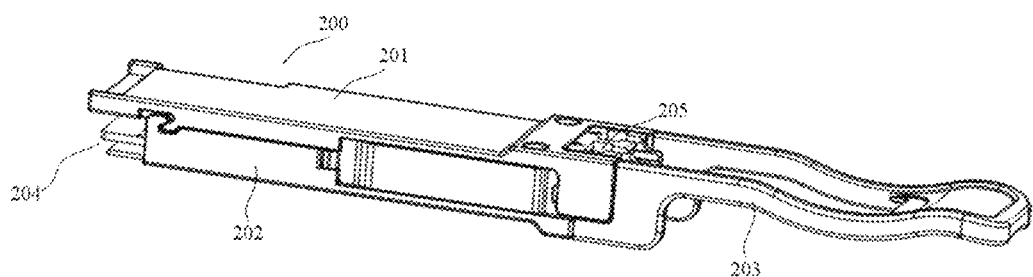
FIG. 3 is a structural diagram of an optical module, in accordance with some embodiments.
Figure 4:
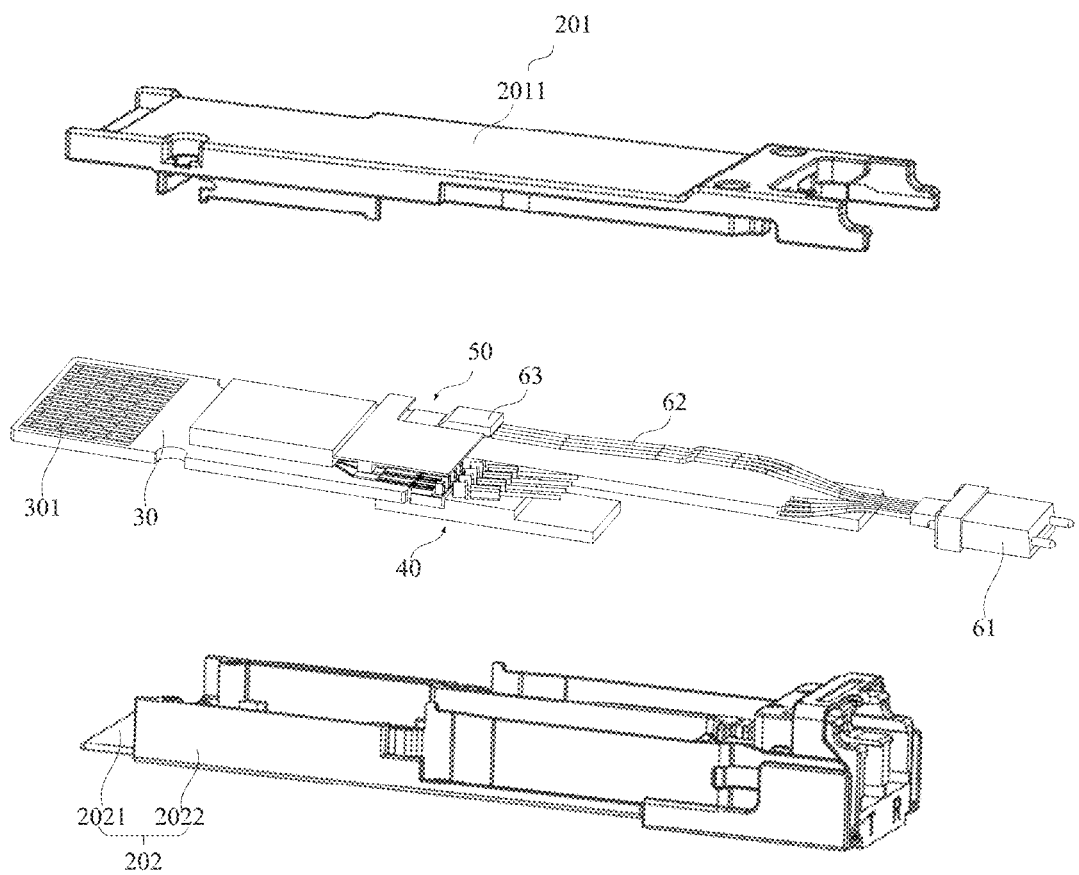
FIG. 4 is an exploded structural diagram of an optical module, in accordance with some embodiments.

FIG. 3 is a structural diagram of an optical module 200 in accordance with some embodiments, and FIG. 4 is an exploded structural diagram of an optical module 200 in accordance with some embodiments. As shown in FIGS. 3 and 4, the optical module 200 includes a shell, a circuit board 30 disposed in the shell, a light-transmitting device 40 and a light-receiving device 50.

The shell includes an upper shell 201 and a lower shell 202. The upper shell 201 is covered on the lower shell 202 to form the shell with two openings 204 and 205, and an outer contour of the shell is generally in a cuboid shape.

In some embodiments, the lower shell 202 includes a bottom plate 2021 and two lower side plates 2022 located on two sides of the bottom plate 2021 respectively and disposed perpendicular to the bottom plate 2021; and the upper shell 201 includes a cover plate 2011, and the cover plate 2011 covers the two lower side plates 2022 of the lower shell 202 to form the above shell.

In some embodiments, the lower shell 202 includes a bottom plate and two lower side plates located on two sides of the bottom plate respectively and disposed perpendicular to the bottom plate; the upper shell 201 may include a cover plate and two upper side plates located on two sides of the cover plate respectively and disposed perpendicular to the cover plate; and the two upper side plates are combined with the two lower side plates respectively, so that the upper shell 201 covers the lower shell 202.

A direction of a connecting line between the two openings 204 and 205 may be the same as a longitudinal direction of the optical module 200, or may not be the same as the longitudinal direction of the optical module 200. For example, the opening 204 is located at an end (a left end in FIG. 3) of the optical module 200, and the opening 205 is also located at an end (a right end in FIG. 3) of the optical module 200. Alternatively, the opening 204 is located at an end of the optical module 200, and the opening 205 is located on a side of the optical module 200. The opening 204 is the electrical port, and a connecting finger 301 of the circuit board 30 extends from the electrical port 204, and is inserted into the master monitor (e.g., the optical network terminal 100). The opening 205 is the optical port, and is configured to access the external optical fiber 101, so that the optical fiber 101 is connected to the light-transmitting device 40 and the light-receiving device 50 inside the optical module 200.

By using an assembly mode of combining the upper shell 201 with the lower shell 202, it is possible to facilitate installation of the circuit board 30, the light-transmitting device 40, the light-receiving device 50 and other optical devices into the shell, and the upper shell 201 and the lower shell 202 may form encapsulation and protection for these devices. In addition, when the circuit board 30, the light-transmitting device 40, the light-receiving device 50 and other devices are assembled, it is possible to facilitate arrangement of positioning components, heat dissipation components, and electromagnetic shielding components of these devices, which is conducive to implementation of automated production.

In some embodiments, the upper shell 201 and the lower shell 202 are generally made of a metallic material, which facilitates electromagnetic shielding and heat dissipation.

In some embodiments, the optical module 200 further includes an unlocking component 203 located on an outer wall of the shell thereof, and the unlocking component 203 is configured to implement or release a fixed connection between the optical module 200 and the master monitor.

For example, the unlocking component 203 is located on outer walls of the two lower side plates 2022 of the lower shell 202, and includes an engagement component that is matched with the cage of the master monitor (e.g., the cage 106 of the optical network terminal 100). When the optical module 200 is inserted into the cage of the master monitor, the optical module 200 is fixed in the cage of the master monitor by the engagement component of the unlocking component 203. When the unlocking component 203 is pulled, the engaging component of the unlocking component 203 moves with the pulling, and then a connection relationship between the engagement component and the master monitor is changed to release engagement between the optical module 200 and the master monitor, so that the optical module 200 may be drawn out of the cage of the master monitor.

The circuit board 30 includes a circuit wiring, electronic elements, chips, etc. Through the circuit wiring, the electronic elements and the chips are connected together according to a circuit design, so as to implement functions such as power supply, transmission of electrical signals, and grounding. The electronic elements may include, for example, capacitors, resistors, triodes, and metal-oxide-semiconductor field-effect transistors (MOSFETs). The chips may include, for example, a microcontroller unit (MCU), a clock data recovery (CDR) chip, a power management chip, and a digital signal processing (DSP) chip.

The circuit board 30 is generally a rigid circuit board, and the rigid circuit board may also implement a bearing function due to its relatively hard material, for example, the rigid circuit board may stably bear the electronic components and the chips; in a case where the light-transmitting device 40 and the light-receiving device 50 are located on the circuit board 30, the rigid circuit board may also provide stable bearing; and the rigid circuit board may also be inserted into the electrical connector in the cage 106 of the upper computer.

The circuit board 30 further includes a connecting finger 301 formed on an end surface thereof, and the connecting finger 301 is composed of a plurality of independent pins. The circuit board 30 is inserted into the cage 106, and the circuit board 300 is conductively connected to the electrical connector in the cage 106 through the connecting finger 301. The connecting finger 301 may be disposed on only a surface (e.g., an upper surface shown in FIG. 4) of the circuit board 300, or may be disposed on both upper and lower surfaces of the circuit board to adapt to an occasion with a demand for a large number of pins. The connecting finger 301 is configured to establish electrical connection with the master monitor to achieve power supply, grounding, transmission of 12C signals, and transmission of data signals, etc.

Of course, flexible circuit boards are also used in some optical modules. As a supplement to the rigid circuit board, a flexible circuit board is generally used in conjunction with the rigid circuit board. For example, the circuit board 30 may be connected to the light-transmitting device 40 through a flexible circuit board.

In some embodiments, the light-transmitting device 40 is disposed on a surface of the circuit board 30, and is electrically connected to the circuit board 30 by means of welding. In some other embodiments, the light-transmitting device 40 is physically separated from the circuit board 30, and the light-transmitting device 40 is electrically connected to the circuit board 30 through a flexible circuit board.

In some embodiments, the light-receiving device 50 is disposed on the surface of the circuit board 30, and is electrically connected to the circuit board 30 by means of welding. In some other embodiments, the light-receiving device 50 is physically separated from the circuit board 30, and is electrically connected to the circuit board 30 through a flexible circuit board.

The optical module 200 further includes an optical fiber socket 61 and an optical fiber ribbon 62. An end of the optical fiber ribbon 62 is connected to the light-receiving device 50, and another end thereof is connected to the optical fiber socket 61. The optical fiber socket 61 forms the optical port 205 of the optical module 200, and is configured to access the optical fiber 101 outside the optical module 200. The optical signal transmitted by the optical fiber 101 is transmitted to the light-receiving device 50 through the optical fiber socket 61 and the optical fiber ribbon 62.

Figure 5:
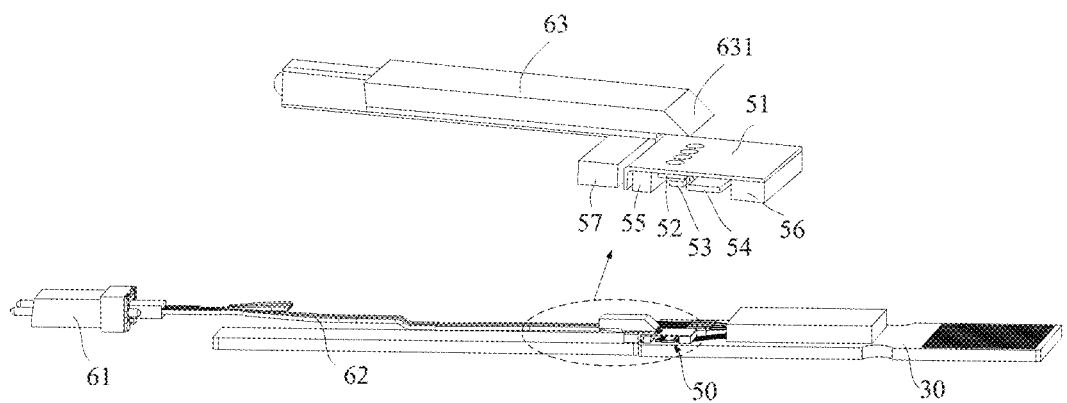
FIG. 5 is a structural diagram of a circuit board and a light-receiving device, in accordance with some embodiments.

FIG. 5 is a structural diagram of a circuit board and a light-receiving device in accordance with some embodiments. As shown in FIG. 5, in order to facilitate the connection between the optical fiber ribbon 62 and the light-receiving device 50, in some embodiments of the present disclosure, the optical module 200 includes a light-conducting component 63.

For example, the light-conducting member 63 is an optical fiber ribbon connector, and the light-conducting component 63 is configured to clamp an end of the optical fiber ribbon 62 that is connected to the light-receiving device 50. The end of the optical fiber ribbon 62 is set as an inclined surface, and light is reflected on the inclined surface, so that the light output by the optical fiber ribbon 62 is directed toward the light-receiving device 50. Accordingly, the end of the light-conducting component 63 is also set as an inclined surface 631, and the inclined surface 631 is parallel to the inclined surface of the optical fiber ribbon 62.

For example, the light-conducting component 63 may also be an arrayed waveguide grating (AWG), and the light-conducting component 63 is configured to divide an optical signal transmitted in one optical fiber into a plurality of optical signals (e.g., the optical signal in one optical fiber is divided into four optical signals). The end of the light-conducting component 63 is set as an inclined surface 631, and light is reflected on the inclined surface 631, so that the light output by the light-conducting component 63 is directed toward the light-receiving device 50.

It will be noted that, one or more optical fibers may be provided in the optical fiber ribbon 62 according to the structure of the light-conducting component 63. The light-receiving device 50 capable of receiving four channels of optical signals is taken for an example, in a case where the light-conducting component 63 is the optical fiber ribbon connector, the optical fiber ribbon 62 includes four optical fibers. In a case where the light-conducting component 63 is an AWG, the optical fiber ribbon 62 includes one optical fiber.

As a communication rate of the optical module 200 increases, in order for the light-receiving device 50 to meet the requirement of a high photoelectric conversion rate, it is common practice to reduce an area of a photosensitive surface of the light-receiving chip 53 in the light-receiving device 50. For example, an optical module with a signal transmission rate of 400 Gb/s has a high requirement for a bandwidth of the light-receiving device 50, which causes the photosensitive surface of the light-receiving chip 53 to be reduced further compared with a photosensitive surface of a light-receiving chip with a signal transmission rate of 100 Gb/s, and a diameter of the photosensitive surface of the light-receiving chip 53 is reduced from 20 um to 16 um. In order to deal with the difficulty of optical coupling between the light-receiving chip 53 and the optical fiber ribbon 62 due to a shrinkage of the photosensitive surface of the light-receiving chip 53, a focusing lens 52 is added into the light-receiving device 50 in some embodiments of the present disclosure, so as to reduce a beam spot irradiated on the photosensitive surface of the light-receiving chip 53 and improve an optical coupling efficiency between the light-receiving chip 53 and the optical fiber ribbon 62.

Figure 6:
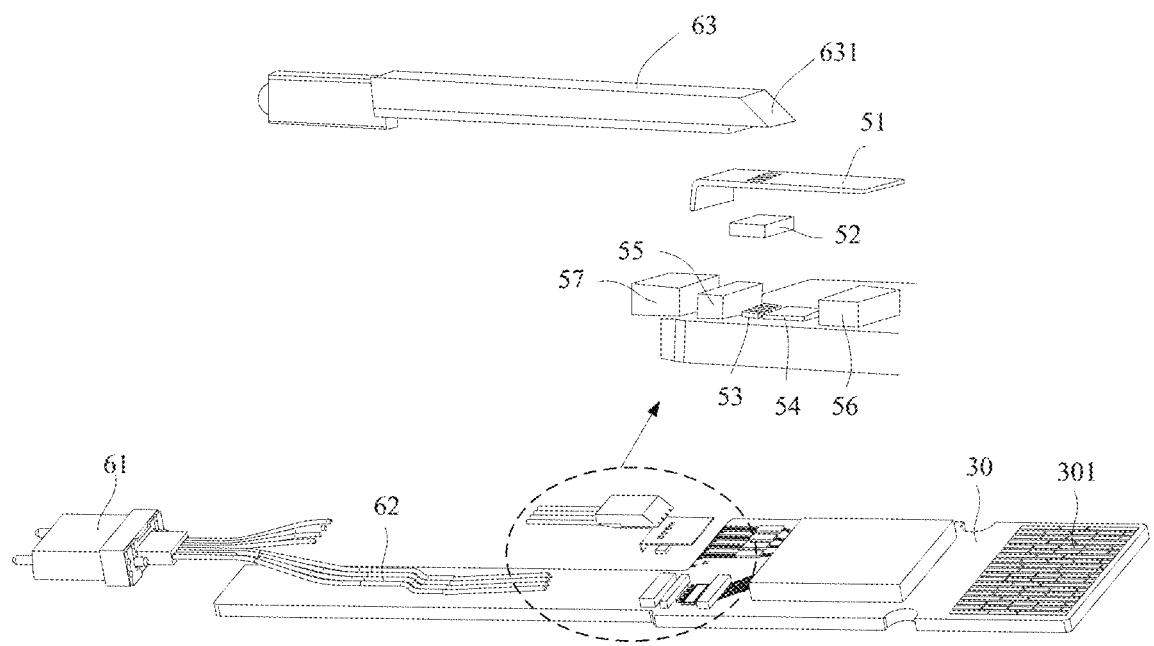
FIG. 6 is an exploded structure diagram of a circuit board and a light-receiving device, in accordance with some embodiments.
Figure 7:
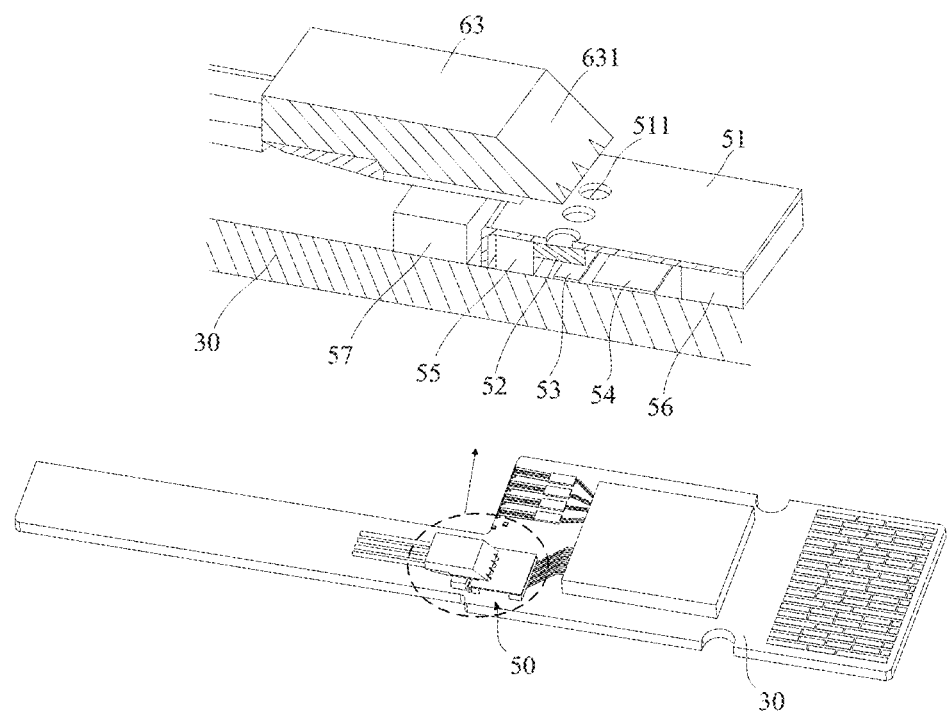
FIG. 7 is a cross-sectional view of a light-receiving device, in accordance with some embodiments.

FIG. 6 is an exploded structure diagram of a circuit board and a light-receiving device in accordance with some embodiments, and FIG. 7 is a cross-sectional view of a light-receiving device in accordance with some embodiments. As shown in FIGS. 5 to 7, the light-receiving device 50 includes at least one light-receiving chip 53 and at least one focusing lens 52 in one-to-one correspondence with the at least one light-receiving chip 53. It will be noted that, numbers of the light-receiving chips 53 and the focusing lenses 52 are not limited in the present disclosure, and may be one or more. For example, the light-receiving device 50 has four light-receiving chips 53 and four focusing lenses 52. A light-receiving chip 53 and a focusing lens 52 corresponding to the light-receiving chip 53 are referred to as a light-receiving channel, and one light-receiving channel is taken as an example for description in the following.

The light-receiving chip 53 is mounted on the circuit board 30, and is configured to convert an optical signal from the outside of the optical module 200 into a current signal. A surface of the light-receiving chip 53 away from the circuit board 30 is the photosensitive surface, and the focusing lens 52 is disposed opposite to the photosensitive surface of the light-receiving chip 53. That is, the optical signal from the outside of the optical module 200 is converged by the focusing lens 52 and is incident on the photosensitive surface of the light-receiving chip 53.

The optical signal transmitted by the optical fiber 101 is transmitted to the light-conducting component 63 through the optical fiber socket 61 and the optical fiber ribbon 62, and is incident into the focusing lens 52 through a light outlet of the light-conducting component 63 after being reflected by the inclined surface 631 of the light-conducting component 63, and is further incident on the photosensitive surface of the light-receiving chip 53 after being converged by the focusing lens 52, so that the optical module 200 can receive external optical signals.

In some embodiments of the present disclosure, the optical module 200 includes a focusing lens 52, and the focusing lens 52 is opposite to the photosensitive surface of the light-receiving chip 53, and the optical signal from the outside of the optical module 200 is converged by the focusing lens 52 and then is incident on the photosensitive surface of the light-receiving chip 53, which may reduce a beam spot incident on the photosensitive surface of the light-receiving chip 53, and further improve the optical coupling efficiency between the light-receiving chip 53 and the optical fiber ribbon 62.

In order to realize the fixation of the focusing lens 52, the light-receiving device 50 further includes a lens fixing component 51. The lens fixing component 51 may be made of a metallic material, so that the lens fixing component 51 has high strength, so as to improve stability of a relative position between the focusing lens 52 fixed thereon and the light-receiving chip 53.

The lens fixing component 51 has a through hole 511, and the through hole 511 corresponds to a position of the light outlet of the light-conducting component 63. The focusing lens 52 is disposed on a surface of the lens fixing component 51 away from the light outlet of the light-conducting component 63, and corresponds to a position of the through hole 511 and to the photosensitive surface of the light-receiving chip 53. That is, the light transmitted from the light outlet of the light-conducting component 63 is incident into the focusing lens 52 through the through hole 511, and is then incident on the photosensitive surface of the light-receiving chip 53 after being converged by the focusing lens 52. Valid optical signals may be transmitted, and an effect of stray laser beams on the light-receiving chip 53 may be avoided through the above arrangement.

However, it is not limited to this. In some embodiments, the focusing lens 52 is disposed on a surface of the lens fixing component 51 close to the light outlet of the light-conducting component 63, or the focusing lens 52 is disposed in the through hole 511 in the lens fixing component 51.

In some embodiments, a structure of the lens fixing component 51 is L-shaped, and includes a horizontal plate 51a and a vertical plate 51b provided at an end of the horizontal plate 51a. The through hole 511 is provided on the horizontal plate 51a and corresponds to the position of the light outlet of the light-conducting component 63. The focusing lens 52 is disposed on a surface of the horizontal plate 51a away from the light outlet of the light-conducting component 63 and corresponds to the position of the through hole 511.

In a case where the light-receiving device 50 has four light-receiving chips 53 and four focusing lenses 52, the lens fixing component 51 has four through holes 511.

The light-receiving device 50 further includes a first support block 55 and a second support block 56. The first support block 55 and the second support block 56 are disposed on the circuit board 30 and are located on two sides of the light-receiving chip 53 and are configured to support the lens fixing component 51. The first support block 55 and the second support block 56 may be made of a non-conductive material, which can prevent the first support block 55 and the second support block 56 from conducting electricity. Further, this can also prevent unnecessary electrical connection between the lens fixing component 51 that is made of a metallic material and the circuit board 30.

The focusing lens 52 is provided on the lens fixing component 51, so stability of a position of the lens fixing component 51 should be ensured first, so as to ensure stability of a relative position among the focusing lens 52, the light-receiving chip 53 and the light-conducting component 63, thereby ensuring an optical coupling efficiency between the light-conducting component 63 and the light-receiving chip 53. Therefore, when the lens fixing component 51 is supported by the first support block 55 and the second support block 56, in some embodiments of the present disclosure, the first support block 55 and the second support block 56 may be made of a material with a high processing accuracy and a small thermal expansion coefficient, such as ceramic and glass.

In some embodiments of the present disclosure, by supporting the lens fixing component 51 through the first support block 55 and the second support block 56, it may be possible to provide the lens fixing component 51 with a more stable bearing surface, so as to ensure stability of the relative position between the focusing lens 52 and the light-receiving chip 53, and stability of a relative position between the focusing lens 52 and the light-conducting component 63, thereby ensuring stability of an optical coupling efficiency between the light-receiving chip 53 and the optical fiber ribbon 62 clamped in the light-conducting component 63.

When the optical module 200 is packaged, the first support block 55 and the second support block 56 may be fixed on the circuit board 30 through a non-conductive adhesive, and there is a certain distance between the first support block 55 and the second support block 56 to accommodate the light-receiving chip 53, that is, the light-receiving chip 53 is disposed between the first support block 55 and the second support block 56. In some implementations, an insulating layer may also be provided on the circuit board 30 where the first support block 55 and the second support block 56 are installed, so that the first support block 55 and the second support block 56 may be fixed on the insulating layer through a silver adhesive.

The horizontal plate 51a of the lens fixing component 51 is fixedly connected to the first support block 55 and the second support block 56 through a silver adhesive, that is, the lens fixing component 51 is erected on the first support block 55 and the second support block 56. In addition, the first support block 55 is disposed close to the vertical plate 51b of the lens fixing component 51, and the first support block 55 is used to provide a positioning surface for the lens fixing component 51, thereby improving a positioning accuracy and an installation speed of the lens fixing component 51. The second support block 56 is disposed away from the vertical plate 51b of the lens fixing component 51, for example, the second support block 56 is located at an end of the horizontal plate 51a away from the vertical plate 51b.

When the optical module 200 is packaged, a passive mounting manner may also be used to fix the focusing lens 52 to the position on the horizontal plate 51a where the through hole 511 is provided through the silver adhesive.

It will be noted that, the silver adhesive has small material particles and a low fluidity compared with an ordinary adhesive, so that the movement amount of the first support block 55, the horizontal plate 51a and the focusing lens 52 is small after the horizontal plate 51a is fixed on the first support block 55 and the focusing lens 52 is fixed on the horizontal plate 51a, thereby ensuring the positioning accuracy and packaging speed. Of course, in some other embodiments, other materials of adhesive may also be used.

In addition, since the focusing lens 52 can converge the divergent light output by the optical fiber ribbon 62, the optical coupling efficiency can also be satisfied when an aligning accuracy between the focusing lens 52 and the light-receiving chip 53 is not high, and thus the focus lens 52 is packaged in a passive manner in some embodiments of the present disclosure. However, it is not limited to this. The focusing lens 52 may also be packaged in an active manner in some other embodiments.

Being packaged in a passive manner refers to mounting the focusing lens 52 when there is no light in the optical fiber ribbon 62; being packaged in an active manner refers to mounting the focusing lens 52 when there is light in the optical fiber ribbon 62 to ensure an optical coupling efficiency.

In this way, the structure after being assembled is that the light-receiving chip 53 and the focusing lens 52 are located between the first support block 55 and the second support block 56, and the vertical plate 51b is located on a side of the first support block 55 away from the second support block 56.

In some embodiments of the present disclosure, when an optical signal is received, after the light-receiving chip 53 is used to convert the received optical signal into a current signal, a transimpedance amplifier is also used to convert the current signal into a voltage signal, and the voltage signal is output as a high-frequency differential signal. Then, a limiting amplifier is used to further amplify the high-frequency differential signal output by the transimpedance amplifier and limit it to a pre-set differential amplitude to obtain the final electrical signal.

Figure 8A:
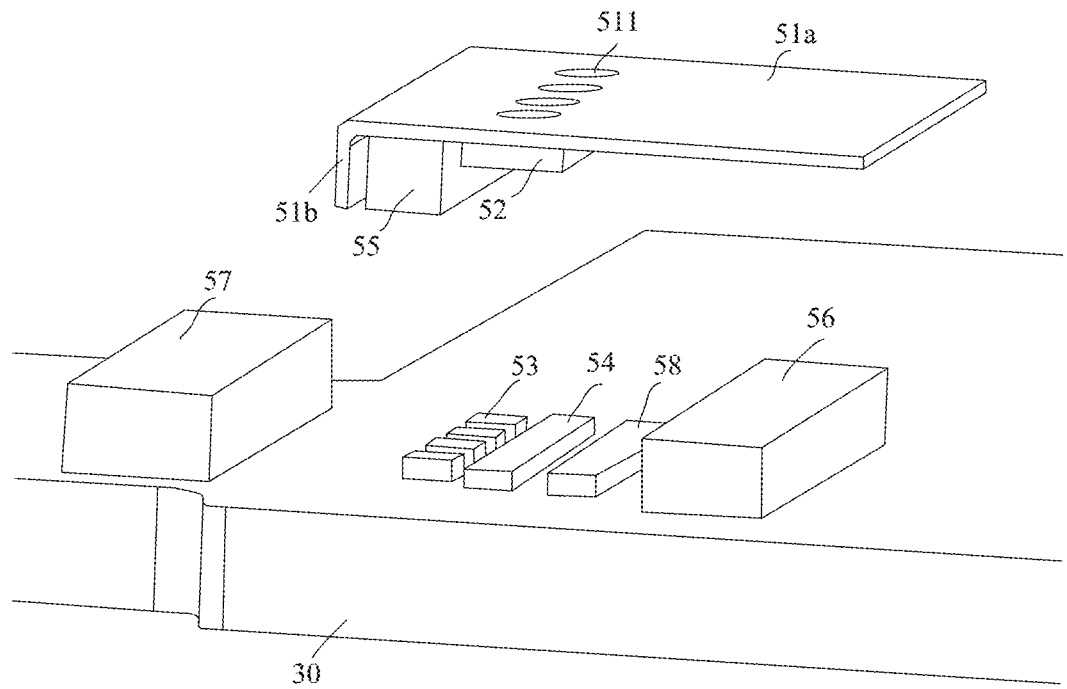
FIG. 8A is an exploded structural diagram of a light-receiving device, in accordance with some embodiments.

Based on this, as shown in FIG. 8A, in some embodiments of the present disclosure, the light-receiving device 50 further includes a transimpedance amplifier 54 and a limiting amplifier 58. The transimpedance amplifier 54 is disposed on the circuit board 30, is electrically connected to the light-receiving chip 53, and is configured to convert the current signal from the light-receiving chip 53 into a voltage signal. The limiting amplifier 58 is disposed on the circuit board 30, is electrically connected to the transimpedance amplifier 54, and is configured to amplify the voltage signal and limit it to the pre-set differential amplitude.

Figure 8B:
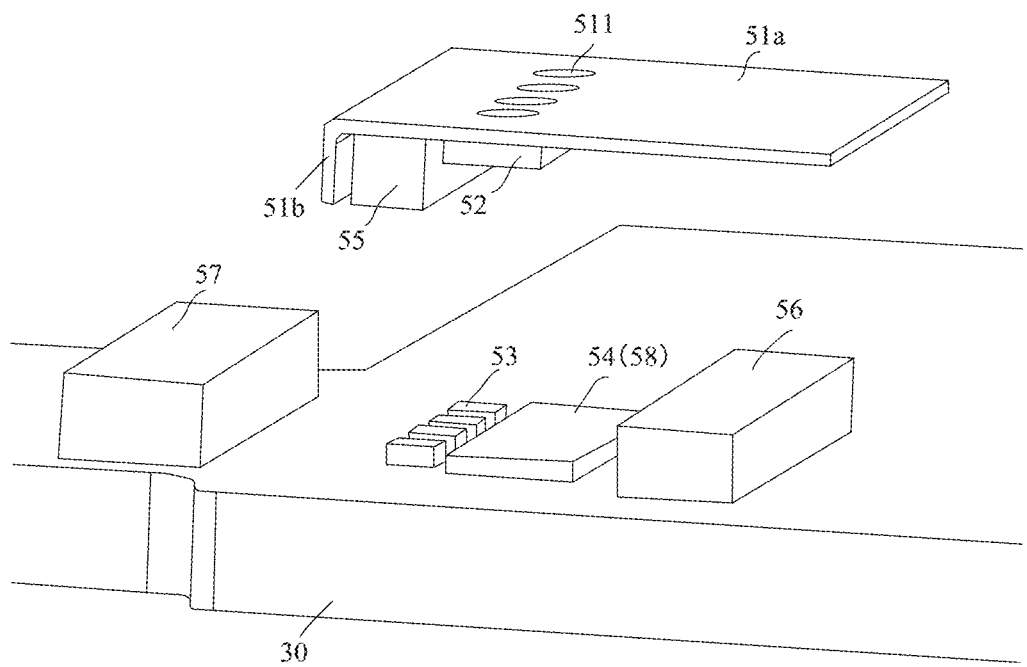
FIG. 8B is another exploded structural diagram of a light-receiving device, in accordance with some embodiments.

Of course, in some embodiments, as shown in FIG. 8B, the limiting amplifier 58 may also be integrated with the transimpedance amplifier 54.

In consideration of a flow direction of the signal, in order to save a layout area, the transimpedance amplifier 54 is located between the first support block 55 and the second support block 56, for example, the transimpedance amplifier 54 is disposed close to the second support block 56. In addition, since the current signal output by the light-receiving chip 53 is generally small, in order to reduce a distortion on the current signal due to a signal transmission distance, the transimpedance amplifier 54 is disposed close to the light-receiving chip 53. That is, the transimpedance amplifier 54 is disposed between the light-receiving chip 53 and the second support block 56.

The transimpedance amplifier 54 may be electrically connected to the circuit board 30 by wire bonding, and then is electrically connected to the light-receiving chip 53 and the limiting amplifier 58 through a high frequency signal line disposed on the circuit board 30.

Figure 9A:
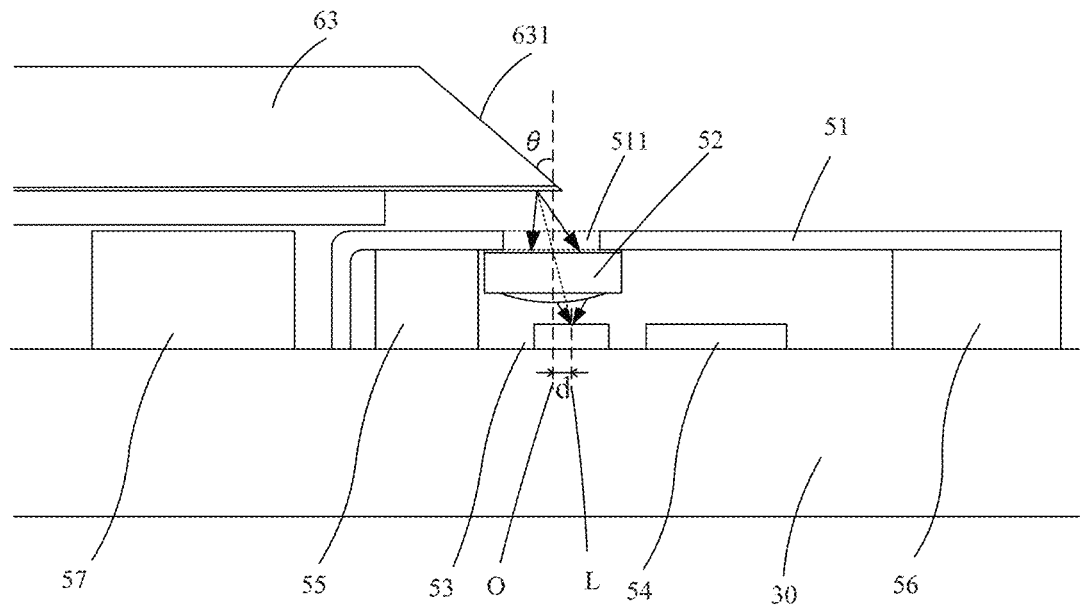
FIG. 9A is a side view of a light-receiving device, in accordance with some embodiments.
Figure 9B:
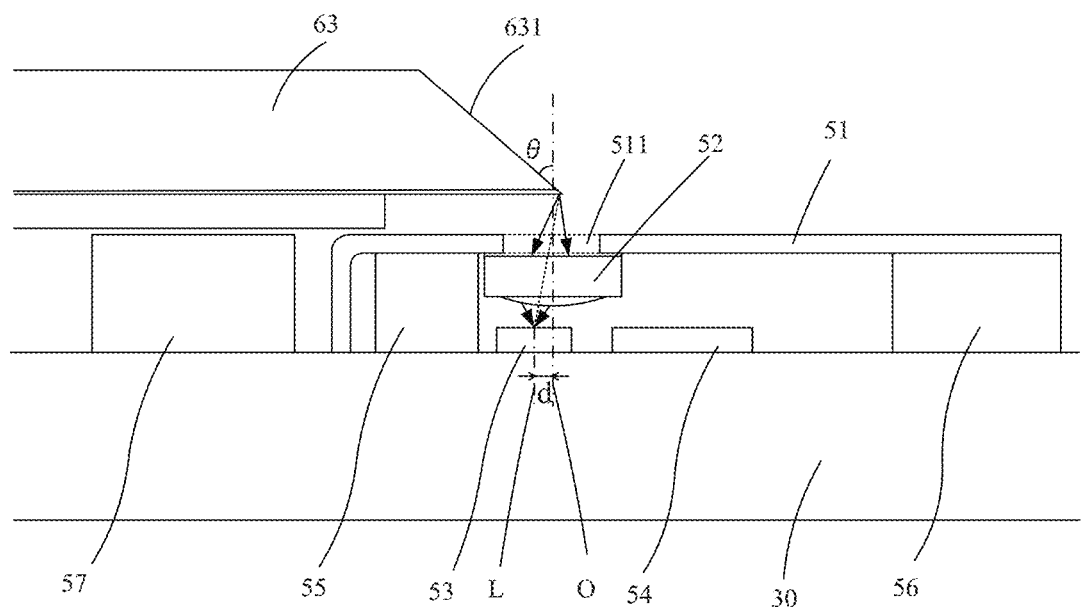
FIG. 9B is another side view of a light-receiving device, in accordance with some embodiments.

FIGS. 9A and 9B are side views of a light-receiving device, in accordance with some embodiments. As shown in FIGS. 9A and 9B, when an optical signal is received, the light carrying signals transmitted by the optical fiber ribbon 62 is reflected on the inclined surface 631 of the light-conducting component 63, and then is incident into the focusing lens 52 through the through hole 511, and then the divergent light is converged on the photosensitive surface of the light-receiving chip 53. In order to prevent the converged light from being perpendicularly incident on the photosensitive surface and causing the light reflected by the photosensitive surface to enter the optical fiber ribbon 62 again along the original optical path, in some embodiments of the present disclosure, an angle θ between the inclined surface 631 of the light-conducting component 63 and an optical axis O of the focusing lens 52 is not 45 degrees. Based on this, the light transmitted from the light-conducting component 63 is not perpendicularly directed toward the photosensitive surface of the light-receiving chip 53, thus it is avoided that the light reflected by the photosensitive surface enters the optical fiber ribbon 62 along the original optical path.

The light transmitted from the light-conducting component 63 is obliquely directed toward the photosensitive surface of the light-receiving chip 53, and a position of the light on the photosensitive surface deviates from a center of the photosensitive surface, thereby reducing the optical coupling efficiency. In order to improve the optical coupling efficiency, there is a certain distance d between a central axis L of the photosensitive surface of the light-receiving chip 53 and the optical axis O of the focusing lens 52.

In some embodiments, as shown in FIG. 9A, the angle θ between the inclined surface 631 of the light-conducting component 63 and the optical axis O of the focusing lens 52 is greater than 45 degrees, and the light transmitted from the light-conducting component 63 is deflected toward the transimpedance amplifier 54 and is way from the first support block 55. In this case, there is the distance d between the central axis L of the photosensitive surface of the light-receiving chip 53 and the optical axis O of the focusing lens 52, and the central axis L of the photosensitive surface of the light-receiving chip 53 is closer to the transimpedance amplifier 54 than the optical axis O of the focusing lens 52.

In some embodiments, as shown in FIG. 9B, the angle θ between the inclined surface 631 of the light-conducting component 63 and the optical axis O of the focusing lens 52 is less than 45 degrees, and the light transmitted from the light-conducting component 63 is deflected toward the first support block 55 and is away from the transimpedance amplifier 54. In this case, there is the distance d between the central axis L of the photosensitive surface of the light-receiving chip 53 and the optical axis O of the focusing lens 52, and the central axis L of the photosensitive surface of the light-receiving chip 53 is closer to the first support block 55 than the optical axis O of the focusing lens 52.

The distance d may be determined according to factors such as an area of the photosensitive surface, a distance between the photosensitive surface and the focusing lens 52. For example, a value of d is set in a range from 10 um to 20 um, such as 12 um, 13 um, 15 um, 16 um, 18 um and 19 um, but it is not limited to this value range.

In some embodiments of the present disclosure, in order to prevent the light reflected by the photosensitive surface from affecting other devices in the optical module 200, and in consideration of the direction of the light transmitted from the light-conducting component 63, the focusing lens 52 is shifted to the transimpedance amplifier 54. In this way, the light converged by the focusing lens 52 may be obliquely irradiated on the photosensitive surface of the light-receiving chip 53, and the light reflected by the photosensitive surface may be irradiated on the first support block 55, so as to avoid affecting the optical devices in the optical module 200.

To facilitate the fixation of the position of the light-conducting component 63, the light-receiving device 50 further includes a third support block 57. The third support block 57 is disposed on the circuit board 30 and is located on a side of the vertical plate 51b of the lens fixing component 51 away from the first support block 55, that is, the vertical plate 51b is located between the third support block 57 and the first support block 55. When the optical module 200 is packaged, the third support block 57 may be fixed on the circuit board 30 through an adhesive, and then the light-conducting component 63 may be fixedly connected to the third support block 57 through an adhesive. The third support block 57 may be made of a non-conductive material, which can prevent the third support block 57 from conducting electricity. Further, the adhesive connecting the third support block 57 and the circuit board 30 is a non-conductive adhesive, which may avoid unnecessary electrical connection among the circuit wires, electronic components and chips on the circuit board 30 through the adhesive.

When the light output from the light-conducting component 63 enters the light-receiving chip 53, there is need to ensure stability of the relative position between the light-receiving chip 53 and the light-conducting component 63, so as to ensure stability of the optical coupling efficiency between the light-conducting component 63 and the light-receiving chip 53. When the light-conducting member 63 is supported by the third support block 57, in some embodiments of the present disclosure, the third support block 57 may be made of a material with a high processing accuracy and a small thermal expansion coefficient, such as ceramic and glass.

During the operation of the optical module 200, the third support block 57 may provide a stable bearing surface for the light-conducting member 63 fixed thereon, so as to ensure stability of a relative position between the light-receiving chip 53 and the light-conducting member 63, and further ensure stability of the optical coupling efficiency between the light-receiving chip 53 and the optical fiber ribbon 62 clamped in the light-conducting component 63.

It will be noted that, the lens fixing component 51 is not limited to an L-shaped structure formed by the horizontal plate 51a and the vertical plate 51b. In some embodiments, the lens fixing component 51 may be arranged as a detachable sealed shell structure, and the light-receiving chip 53 is also disposed in the shell. Alternatively, the lens fixing component 51 may be arranged as a structure with an opening provided at the bottom, and the light-receiving chip 53 is disposed in the structure. In this case, the lens fixing component 51 may be fixed on the circuit board 30 without the first support block 55 and the second support block 56.

The foregoing descriptions are merely specific implementation manners of the present disclosure, but the protection scope of the present disclosure is not limited thereto. Any person skilled in the art could conceive of changes or replacements within the technical scope of the present disclosure, which shall be included in the protection scope of the present disclosure. Therefore, the scope of the present disclosure shall be subject to the protection scope of the claims.

What is claimed is:

1. An optical module, comprising:
    a shell;
    a circuit board located in the shell;
    a light-receiving device disposed on the circuit board and electrically connected to the circuit board;
    an optical fiber socket that is configured to provide an optical port of the circuit board;
    an optical fiber ribbon, an end thereof being connected to the optical fiber socket, and another end thereof being optically connected to the light-receiving device; and
    a light-conducting component having a light outlet and configured to transmit an optical signal from the optical fiber ribbon to the light-receiving device, wherein
    the light-receiving device includes:
        a light-receiving chip disposed on a surface of the circuit board and having a photosensitive surface that is away from the circuit board; and
        a focusing lens disposed opposite to the photosensitive surface of the light-receiving chip and configured to converge light transmitted by the optical fiber ribbon to the photosensitive surface of the light-receiving chip,
    wherein the focusing lens and the light-conducting component are disposed independently of each other,
    wherein the light-conducting component is an arrayed waveguide grating, and an end of the arrayed waveguide grating that is optically connected to the light-receiving device has an inclined surface; and an angle between the inclined surface of the light-conducting component and an optical axis of the focusing lens is an acute angle and is not equal to 45 degrees,
    wherein the angle between the inclined surface of the light-conducting component and the optical axis of the focusing lens is greater than 45 degrees, there is a distance between a central axis of the photosensitive surface and the optical axis of the focusing lens, and the central axis of the photosensitive surface is farther away from the light-conducting component than the optical axis of the focusing lens; or
    wherein the angle between the inclined surface of the light-conducting component and the optical axis of the focusing lens is less than 45 degrees, there is the distance between the central axis of the photosensitive surface and the optical axis of the focusing lens, and the central axis of the photosensitive surface is closer to the light-conducting component than the optical axis of the focusing lens.

2. The optical module according to claim 1, wherein the optical fiber ribbon includes an optical fiber, and the arrayed waveguide grating divides an optical signal in the optical fiber into a plurality of optical signals.

3. The optical module according to claim 1, wherein, the light-receiving device further includes a lens fixing component, and the lens fixing component includes a through hole corresponding to a position of the light outlet; and the focusing lens is disposed on the lens fixing component and corresponds to position of the through hole.

4. The optical module according to claim 3, wherein, the focusing lens is disposed in the through hole.

5. The optical module according to claim 3, wherein, the lens fixing component includes a horizontal plate and a vertical plate disposed at an end of the horizontal plate; and the horizontal plate includes the through hole corresponding to the position of the light outlet, and the focusing lens is disposed on the horizontal plate and corresponds to the position of the through hole.

6. The optical module according to claim 5, wherein, the focusing lens is disposed on a surface of the horizontal plate close to the circuit board.

7. The optical module according to claim 5, wherein, the focusing lens is disposed on a surface of the horizontal plate away from the circuit board.

8. The optical module according to claim 5, wherein the light-receiving device further includes a first support block and a second support block;

the first support block and the second support block are disposed on the circuit board, and are respectively located on two opposite sides of the light-receiving chip, and are configured to support the lens fixing component.

9. The optical module according to claim 8, wherein the first support block is disposed close to the vertical plate, and the second support block is located at an end of the horizontal plate away from the vertical plate.

10. The optical module according to claim 8, further comprising a third support block; wherein, the third support block is disposed on the circuit board and is configured to support the light-conducting component.

11. The optical module according to claim 10, wherein, the vertical plate is located between the third support block and the first support block.

12. The optical module according to claim 10, wherein, the first support block, the second support block and the third support block are fixed on the circuit board through a non-conductive adhesive.

13. The optical module according to claim 10, wherein, the first support block, the second support block and the third support block are made of a non-conductive material.

14. The optical module according to claim 13, wherein, the first support block, the second support block and the third support block are fixed on the circuit board through a silver adhesive.

15. The optical module according to claim 8, wherein, the light-receiving device further includes a transimpedance amplifier; wherein, the transimpedance amplifier is disposed between the first support block and the second support block, is electrically connected to the light-receiving chip, and is configured to convert a current signal output by the light-receiving chip into a voltage signal.

* * * * *